(12) United States Patent
Murai

(10) Patent No.: US 11,524,561 B2
(45) Date of Patent: Dec. 13, 2022

(54) VEHICLE POWER UNIT ROOM STRUCTURE

(71) Applicant: TOYOTA JIDOSHA KABUSHIKI KAISHA, Aichi-ken (JP)

(72) Inventor: Daisuke Murai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 82 days.

(21) Appl. No.: 17/144,141

(22) Filed: Jan. 8, 2021

(65) Prior Publication Data

US 2021/0129652 A1    May 6, 2021

Related U.S. Application Data

(62) Division of application No. 16/507,052, filed on Jul. 10, 2019, now Pat. No. 11,034,228.

(30) Foreign Application Priority Data

Sep. 3, 2018 (JP) .............................. JP2018-164874

(51) Int. Cl.
*B60K 1/04* (2019.01)
*H01M 8/04014* (2016.01)
*B60K 11/00* (2006.01)
*H01M 50/20* (2021.01)

(52) U.S. Cl.
CPC ................ *B60K 1/04* (2013.01); *B60K 11/00* (2013.01); *H01M 8/04014* (2013.01); *H01M 50/20* (2021.01)

(58) Field of Classification Search
CPC ..... B60K 1/04; B60K 11/00; H01M 8/04014; H01M 50/20; Y02E 60/50; B62D 25/082
See application file for complete search history.

(56) References Cited

U.S. PATENT DOCUMENTS

| 2002/0189873 A1 | 12/2002 | Mizuno |
| 2012/0055721 A1 | 3/2012 | Matano |
| 2012/0055724 A1 | 3/2012 | Iwasa et al. |

(Continued)

FOREIGN PATENT DOCUMENTS

| CN | 106042878 A | 10/2016 |
| DE | 102011016624 A1 | 10/2012 |

(Continued)

OTHER PUBLICATIONS

Notice of Allowance in U.S. Appl. No. 16/507,052, dated Feb. 18, 2021, 13 pp.

*Primary Examiner* — Erez Gurrari
(74) *Attorney, Agent, or Firm* — Hauptman Ham, LLP

(57) ABSTRACT

A vehicle power unit room structure is provided including a motor that is disposed inside a power unit room and that is configured to transmit drive force to a drive wheel, a compressor that is disposed adjacent to the motor in a vehicle width direction so as to overlap with the motor as viewed along the vehicle width direction, and a power supply section that is configured to supply power supplied from a power source to the motor and the compressor, and that is disposed at a vehicle upper side of the compressor so as to overlap with the compressor as viewed along a vehicle vertical direction.

5 Claims, 9 Drawing Sheets

(56) References Cited

U.S. PATENT DOCUMENTS

| | | | | |
|---|---|---|---|---|
| 2014/0335434 A1* | 11/2014 | Ikeya | ...................... | B60L 50/71 |
| | | | | 429/435 |
| 2015/0027796 A1* | 1/2015 | Naito | ...................... | B60L 1/003 |
| | | | | 180/65.31 |
| 2015/0258913 A1* | 9/2015 | Kobayashi | .............. | B60L 58/20 |
| | | | | 180/65.21 |
| 2015/0298740 A1 | 10/2015 | Winberg et al. | | |
| 2016/0207386 A1* | 7/2016 | Nagaosa | ................. | B60K 1/04 |
| 2016/0285117 A1* | 9/2016 | Tomita | ........... | H01M 8/04395 |
| 2016/0297290 A1* | 10/2016 | Murata | ..................... | B60K 1/04 |
| 2016/0368358 A1* | 12/2016 | Nagaosa | ..................... | B60L 58/30 |
| 2017/0096067 A1* | 4/2017 | Murata | ............ | H01M 8/04029 |
| 2017/0101031 A1* | 4/2017 | Ohashi | ................... | B60K 15/07 |
| 2017/0133691 A1* | 5/2017 | Yamafuji | .......... | H01M 8/04917 |
| 2017/0267301 A1* | 9/2017 | Katano | .................. | B62D 65/02 |
| 2018/0178641 A1* | 6/2018 | Yamafuji | ............ | H01M 8/247 |
| 2019/0193547 A1 | 6/2019 | Ichida et al. | | |
| 2019/0300063 A1* | 10/2019 | Sasaki | ................. | B62D 25/082 |
| 2020/0070640 A1* | 3/2020 | Murai | ............... | H01M 8/04014 |
| 2020/0076270 A1* | 3/2020 | Murai | .................... | B62D 27/02 |
| 2020/0161692 A1* | 5/2020 | Yoshitomi | ................ | B60K 1/04 |
| 2021/0104756 A1* | 4/2021 | Yoshitomi | ........... | H01M 8/2484 |
| 2021/0143453 A1* | 5/2021 | Yoshitomi | ................ | B60L 50/72 |

FOREIGN PATENT DOCUMENTS

| | | |
|---|---|---|
| JP | S57139431 U | 8/1982 |
| JP | 2004237969 A | 8/2004 |
| JP | 2005112202 A | 4/2005 |
| JP | 201120626 A | 2/2011 |
| JP | 2012144142 A | 8/2012 |
| JP | 2015182605 A | 10/2015 |
| JP | 2016199142 A | 12/2016 |
| JP | 2016222176 A | 12/2016 |
| JP | 2018103783 A | 7/2018 |
| JP | 202032813 A | 3/2020 |
| WO | 2014054715 A1 | 4/2014 |

* cited by examiner

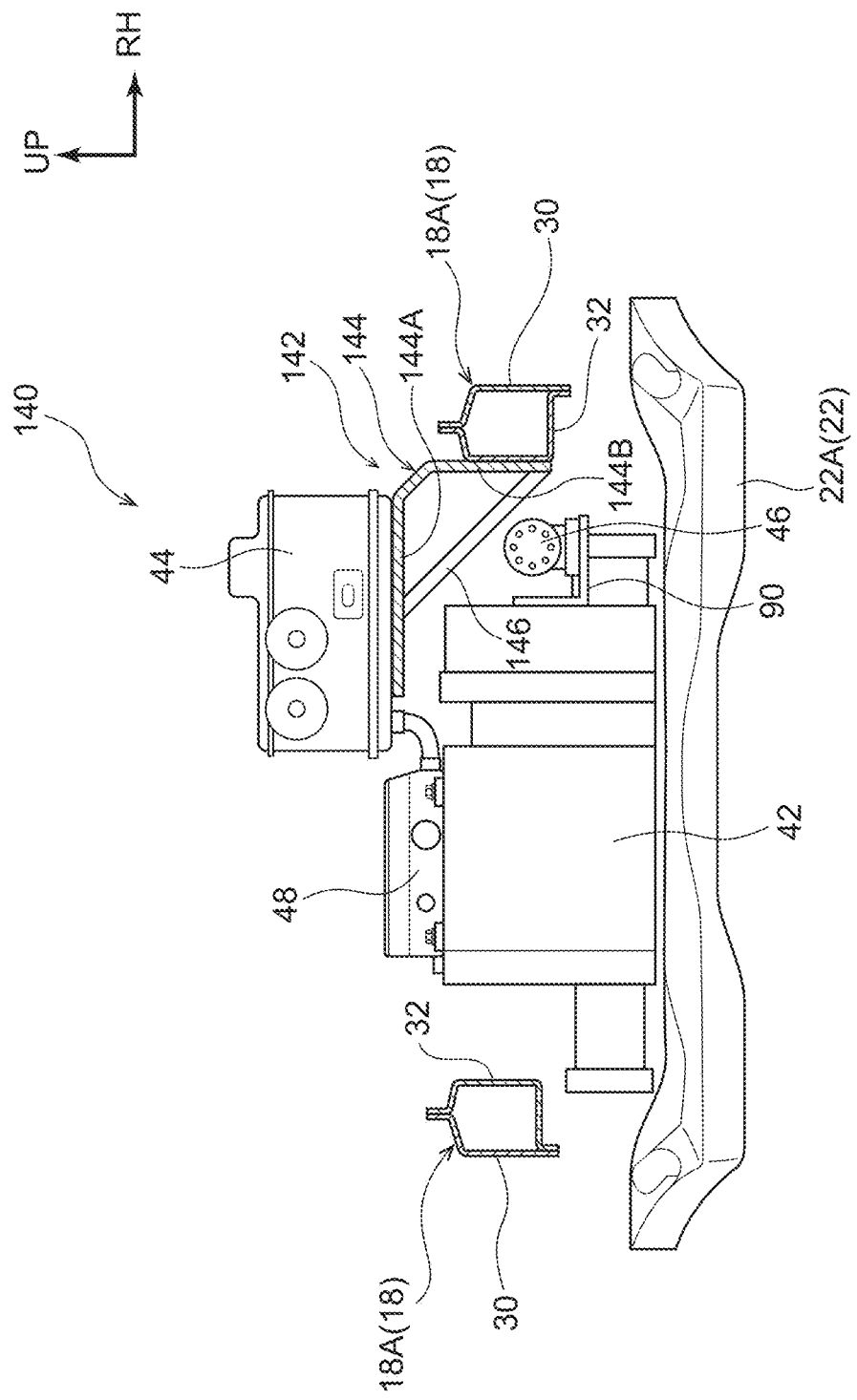

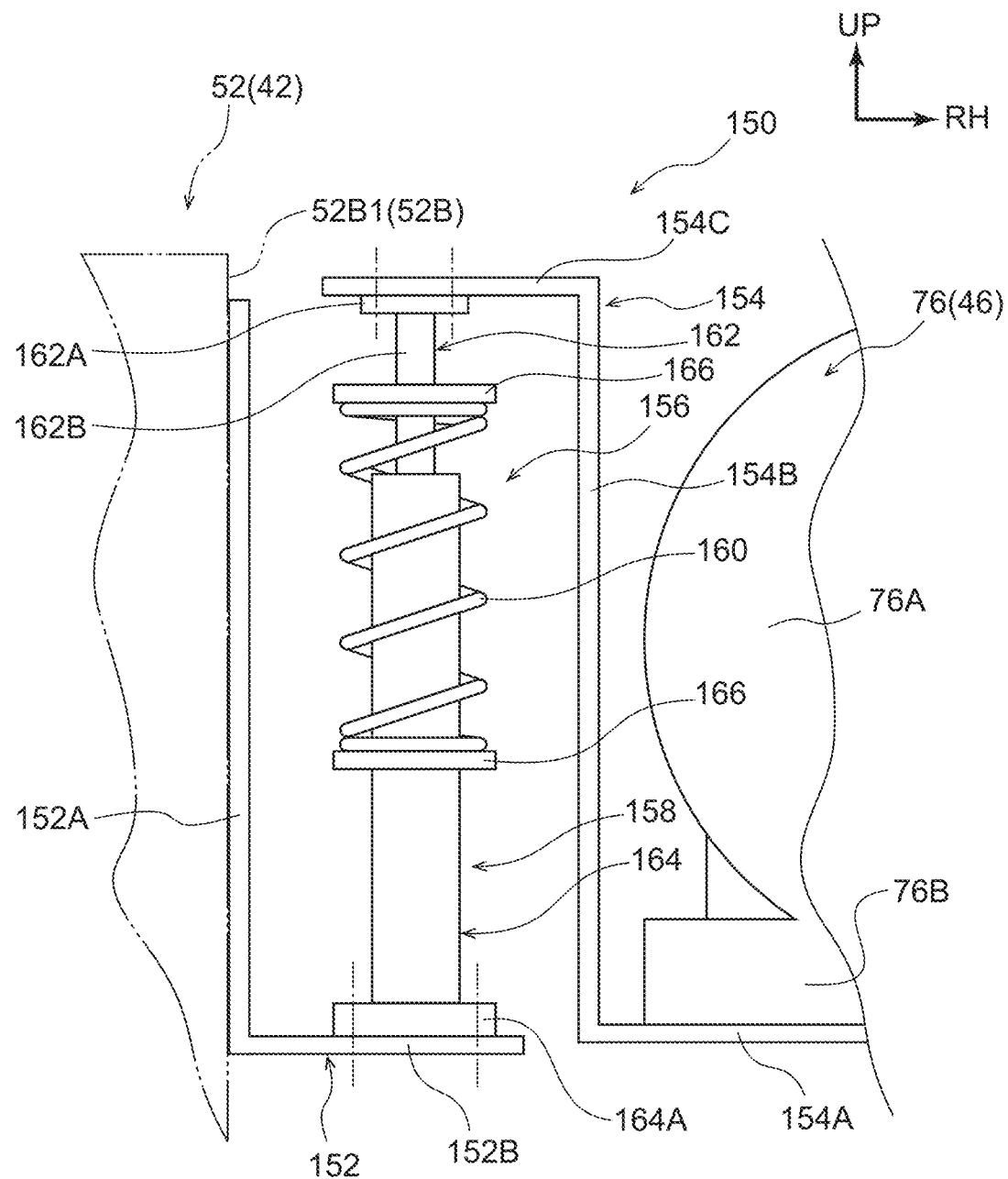

VEHICLE POWER UNIT ROOM STRUCTURE

CROSS-REFERENCE TO RELATED APPLICATION

This application is a divisional application of U.S. patent application Ser. No. 16/507,052, filed on Jul. 10, 2019, which claims priority under 35 USC 119 from Japanese Patent Application No. 2018-164874, filed on Sep. 3, 2018. The contents of these applications are incorporated herein by reference in their entirety.

BACKGROUND

Technical Field

The present disclosure relates to a vehicle power unit room structure.

Related Art

Japanese Patent Application Laid-Open (JP-A) No. 2015-182605 discloses an disclosure relating to an electric vehicle. In this electric vehicle, an auxiliary device configured including a compressor that supplies air to a fuel cell stack (power supply section) is disposed at a vehicle front side of a motor in a power unit room.

If the motor and the auxiliary device were disposed overlapping with each other the vehicle front-rear direction, the space in the vehicle front-rear direction required to contain these components would conceivably increase. In the related art described in JP-A No. 2015-182605, it is therefore conceivable that enlargement of the power unit room in the vehicle front-rear direction might be difficult to suppress.

Although power is supplied to the motor by the fuel cell stack in the related art described in JP-A No. 2015-182605, electric vehicles and hybrid vehicles may also adopt a configuration in which power is supplied to the motor from a power source such as a battery through a junction box (power supply section). In cases in which power is supplied to the motor through a junction box, although there is no need for a compressor to supply air to the fuel cell stack, it is conceivable that an air-conditioner compressor might be disposed in the power unit room.

Namely, even in configurations in which power is supplied to the motor through a junction box, similar considerations remain with regard to the difficulty of suppressing enlargement of the power unit room in the vehicle front-rear direction.

Furthermore, in the related art described in Japanese Patent Application No. 2015-182605, since the compressor is disposed at the vehicle lower side and vehicle front side of the fuel cell stack, there is room for improvement from the perspective of suppressing an increase in the length of a power supply route from the fuel cell stack to the compressor.

SUMMARY

Technical Problem

In consideration of the above circumstances, an object of the present disclosure is to obtain a vehicle power unit room structure configured to suppress an increase in the length of a power supply route from a power supply section to a compressor, while also suppressing enlargement in a vehicle front-rear direction of a power unit room in which a motor, the power supply section, and the compressor are disposed.

Solution to Problem

A vehicle power unit room structure of a first aspect of the present disclosure includes a motor that is disposed inside a power unit room and that is configured to transmit drive force to a drive wheel, a compressor that is disposed adjacent to the motor in a vehicle width direction so as to overlap with the motor as viewed along the vehicle width direction, and a power supply section that is configured to supply power supplied from a power source to the motor and the compressor, and that is disposed at a vehicle upper side of the compressor so as to overlap with the compressor as viewed along a vehicle vertical direction.

In the vehicle power unit room structure of the first aspect of the present disclosure, the motor is disposed inside the power unit room, and power supplied from the power source is supplied to the motor by the power supply section. The motor is driven when supplied with power, and drive force is transmitted to the drive wheel in order to drive the drive wheel.

The compressor is also disposed inside the power unit room, and power is supplied to the compressor by the power supply section. The compressor is driven when supplied with power, and a predetermined coolant or gas is thereby compressed.

Were the motor and compressor to be disposed overlapping with each other in the vehicle front-rear direction, the space required to contain them would conceivably increase in the vehicle front-rear direction.

However, in the present aspect, the compressor is disposed adjacent to the motor in the vehicle width direction so as to overlap with the motor as viewed along the vehicle width direction. Accordingly, an increase in the space required to contain the motor and the compressor in the vehicle front-rear direction can be suppressed by the amount the motor and the compressor overlap with each other as viewed along the vehicle width direction, in comparison to configurations in which the motor and the compressor are disposed overlapping with each other in the vehicle front-rear direction.

Moreover, in the present aspect, the power supply section is disposed at the vehicle upper side of the compressor so as to overlap with the compressor as viewed along the vehicle vertical direction. This enables the distance between the power supply section and the compressor to be made shorter than in configurations in which the power supply section and the compressor are disposed overlapping with each other in the vehicle front-rear direction as viewed along the vehicle vertical direction.

A vehicle power unit room structure of a second aspect of the present disclosure is the vehicle power unit room structure of the first aspect, wherein the compressor is attached to the motor either directly or indirectly.

In the vehicle power unit room structure of the second aspect of the present disclosure, the compressor is attached to the motor either directly or indirectly, thereby enabling the compressor and the motor to function as mutual mass dampers, enabling vibration of the compressor and the motor to be suppressed.

A vehicle power unit room structure of a third aspect of the present disclosure is the vehicle power unit room structure of the second aspect, wherein a first support portion configured to support the compressor is attached to the motor, a second support portion configured to support the compressor is attached to the compressor, and an attenuation portion, which is configured to attenuate relative vibration between the motor and the compressor is interposed between the first support portion and the second support portion.

In the vehicle power unit room structure of the third aspect of the present disclosure, the second support portion that supports the compressor is supported by the first support portion attached to the motor in a state in which the attenuation portion is interposed between the first support portion and the second support portion.

In order to make the compressor function as a mass damper for the motor and suppress vibration of the motor, the mass of the compressor is preferably similar to the mass of the motor. However, such a configuration could result in an increase in the size of the compressor.

In the present aspect, the attenuation portion is configured to attenuate relative vibration between the motor and the compressor, thus enabling the compressor and the attenuation portion to be made to function as an attenuating dynamic vibration absorber for the motor. This thereby enables vibration of the motor to be absorbed without making the mass of the compressor similar to the mass of the motor.

A vehicle power unit room structure of a fourth aspect of the present disclosure is the vehicle power unit room structure of any one of the first aspect to the third aspect, wherein the compressor is disposed at the vehicle width direction inner side of a side member, which extends along a vehicle front-rear direction such that there is spacing in the vehicle width direction between the compressor and the side member.

In the vehicle power unit room structure of the fourth aspect of the present disclosure, the compressor is disposed at the vehicle width direction inner side of the side member, which extends along the vehicle front-rear direction such that there is spacing in the vehicle width direction between the compressor and the side member. Accordingly, even if the side member undergoes folding deformation toward the vehicle width direction inner side due to input of collision load along the vehicle front-rear direction to the vehicle, the amount of collision load that can be absorbed by deformation of the side member before the side member contacts the compressor can be increased. This thereby enables a reduction in the load input to the compressor from the side member.

A vehicle power unit room structure of a fifth aspect of the present disclosure is the vehicle power unit room structure of any one of the first aspect to the third aspect, wherein the compressor is disposed at a position that does not overlap with a side member, which extends along a vehicle front-rear direction as viewed along the vehicle vertical direction.

In the vehicle power unit room structure of the fifth aspect of the present disclosure, the compressor is disposed at a position that does not overlap with the side member, which extends along the vehicle front-rear direction as viewed along the vehicle vertical direction. Accordingly, the compressor and the side member can be suppressed from interfering with one another, even if vibration during travel of the vehicle or the like causes a change in the relative positional relationship between the compressor and the side member in the vehicle vertical direction.

A vehicle power unit room structure of a sixth aspect of the present disclosure is the vehicle power unit room structure of any one of the first aspect to the fifth aspect, wherein the power supply section is attached to an attachment portion provided at a vehicle body configuration member configuring part of a vehicle side section.

In the vehicle power unit room structure of the sixth aspect of the present disclosure, the power supply section is supported by the vehicle body configuration member configuring part of the vehicle side section through the attachment portion.

A vehicle power unit room structure of a seventh aspect of the present disclosure is the vehicle power unit room structure of the sixth aspect, wherein the vehicle body configuration member is a pair of suspension towers, and the attachment portion is a cross member spanning between the pair of suspension towers in the vehicle width direction.

In the vehicle power unit room structure of the seventh aspect of the present disclosure, the power supply section is supported by the cross member spanning between the pair of suspension towers in the vehicle width direction. Since the pair of suspension towers are coupled together in the vehicle width direction by the cross member, relative displacement of the suspension towers in the vehicle width direction is suppressed during travel of the vehicle or the like, such that torsion of the vehicle body is suppressed.

A vehicle power unit room structure of an eighth aspect of the present disclosure is the vehicle power unit room structure of the sixth aspect, wherein the vehicle body configuration member is a pair of front side members, and the attachment portion is a cross member spanning between the pair of front side members in the vehicle width direction.

In the vehicle power unit room structure of the eighth aspect of the present disclosure, the power supply section is supported by the cross member spanning between the pair of front side member in the vehicle width direction. Since the pair of front side members are coupled together in the vehicle width direction by the cross member, the front side members are suppressed from undergoing relative displacement in the vehicle width direction by the cross member when the front side members undergo crushing deformation due to collision load from the vehicle front side. This enables folding deformation of the front side members in the vehicle width direction to be suppressed during crushing deformation of the front side members.

A vehicle power unit room structure of a ninth aspect of the present disclosure is the vehicle power unit room structure of the sixth aspect, wherein the vehicle body configuration member is a pair of front side members, and the attachment portion is a bracket attached to one of the pair of front side members.

In the vehicle power unit room structure of the ninth aspect of the present disclosure, the power supply section is attached to one of the pair of front side members through the bracket attached to the one front side member.

A vehicle power unit room structure of a tenth aspect of the present disclosure is the vehicle power unit room structure of the eighth aspect, wherein each of the pair of front side members is provided with a shaft that projects toward a vehicle width direction inner side and that is used in attachment of the cross member. The cross member is provided with an insertion location through which the shafts are inserted in an axial direction of the shafts, and a fuse portion provided adjacent to the insertion location and configured to undergo plastic deformation so as to permit relative displacement in a vehicle front-rear direction between the shafts and the insertion location in a case in which a load of a predetermined value or greater toward a vehicle rear side acts on the attachment portion.

In the vehicle power unit room structure of the tenth aspect of the present disclosure, each of the pair of front side members is provided with the shaft projecting toward the vehicle width direction inner side, and the cross member, to which the power supply section is attached, is attached to the shafts.

Note that during crushing deformation of the front side members due to collision load from the vehicle front side, it is conceivable that the front side members might not undergo crushing deformation so readily at attachment locations of the front side members to the cross member.

In the present aspect, the insertion location is provided at the cross member, and the shafts provided at the front side members are inserted into the insertion location. The cross member is also provided with the fuse portion adjacent to the insertion location. When load toward the vehicle rear side of the predetermined value or greater acts on the cross member, the fuse portion undergoes plastic deformation, thereby permitting relative displacement between the shafts and the insertion location in the vehicle front-rear direction, and thus permitting relative displacement between the front side members and the cross member.

Accordingly, during crushing deformation of the front side members due to collision load from the vehicle front side, the cross member is displaced toward the vehicle rear side such that the cross member can be suppressed from acting as resistance to this crushing deformation, even if the crushing deformation reaches the locations provided with the shafts.

As described above, the vehicle power unit room structure of the first aspect of the present disclosure exhibits excellent advantageous effects of enabling an increase in the length of a power supply route from the power supply section to the compressor to be suppressed, while also suppressing enlargement in the vehicle front-rear direction of the power unit room in which the motor, the power supply section, and the compressor are disposed.

The vehicle power unit room structure of the second aspect of the present disclosure exhibits an excellent advantageous effect of enabling vibration of components disposed inside the power unit room to be suppressed.

The vehicle power unit room structure of the third aspect of the present disclosure exhibits an excellent advantageous effect of enabling vibration generated by the motor to be suppressed.

The vehicle power unit room structure of the fourth aspect of the present disclosure exhibits an excellent advantageous effect of enabling the side member to be suppressed from affecting the compressor when collision load is input to the vehicle along the vehicle front-rear direction.

The vehicle power unit room structure of the fifth aspect of the present disclosure exhibits an excellent advantageous effect of enabling the side member to be suppressed from affecting the compressor as a result of vibration during travel of the vehicle or the like.

The vehicle power unit room structure of the sixth aspect of the present disclosure exhibits an excellent advantageous effect of enabling the power supply section to be supported in a stable state.

The vehicle power unit room structure of the seventh aspect of the present disclosure exhibits an excellent advantageous effect of enabling the effects of deformation of the vehicle body on the power supply section to be reduced during travel of the vehicle or the like.

The vehicle power unit room structure of the eighth aspect of the present disclosure exhibits excellent advantageous effects of enabling shock absorption performance of the front side members to be secured, while the power supply section is supported in a stable state.

The vehicle power unit room structure of the ninth aspect of the present disclosure exhibits excellent advantageous effects of enabling the power supply section to be supported in a stable state, while suppressing an increase in the complexity of structures peripheral to the power unit room.

The vehicle power unit room structure of the tenth aspect of the present disclosure exhibits excellent advantageous effects of enabling crushing stroke of the front side members in response to collision load from the vehicle front side to be secured, while the power supply section is supported in a stable state.

BRIEF DESCRIPTION OF THE DRAWINGS

Exemplary embodiments of the present disclosure will be described in detail based on the followings figures, wherein:

FIG. 8 is a back face view illustrating configuration of a vehicle body side section and a power unit room applied with a vehicle power unit room structure according to a third exemplary embodiment, as viewed from the vehicle rear side; and FIG. 9 is a back face view illustrating configuration of a coupling portion between a motor and a compressor inside a power unit room applied with a vehicle power unit room structure according to a fourth exemplary embodiment, as viewed from the vehicle rear side.

DETAILED DESCRIPTION

First Exemplary Embodiment

Figure 1:
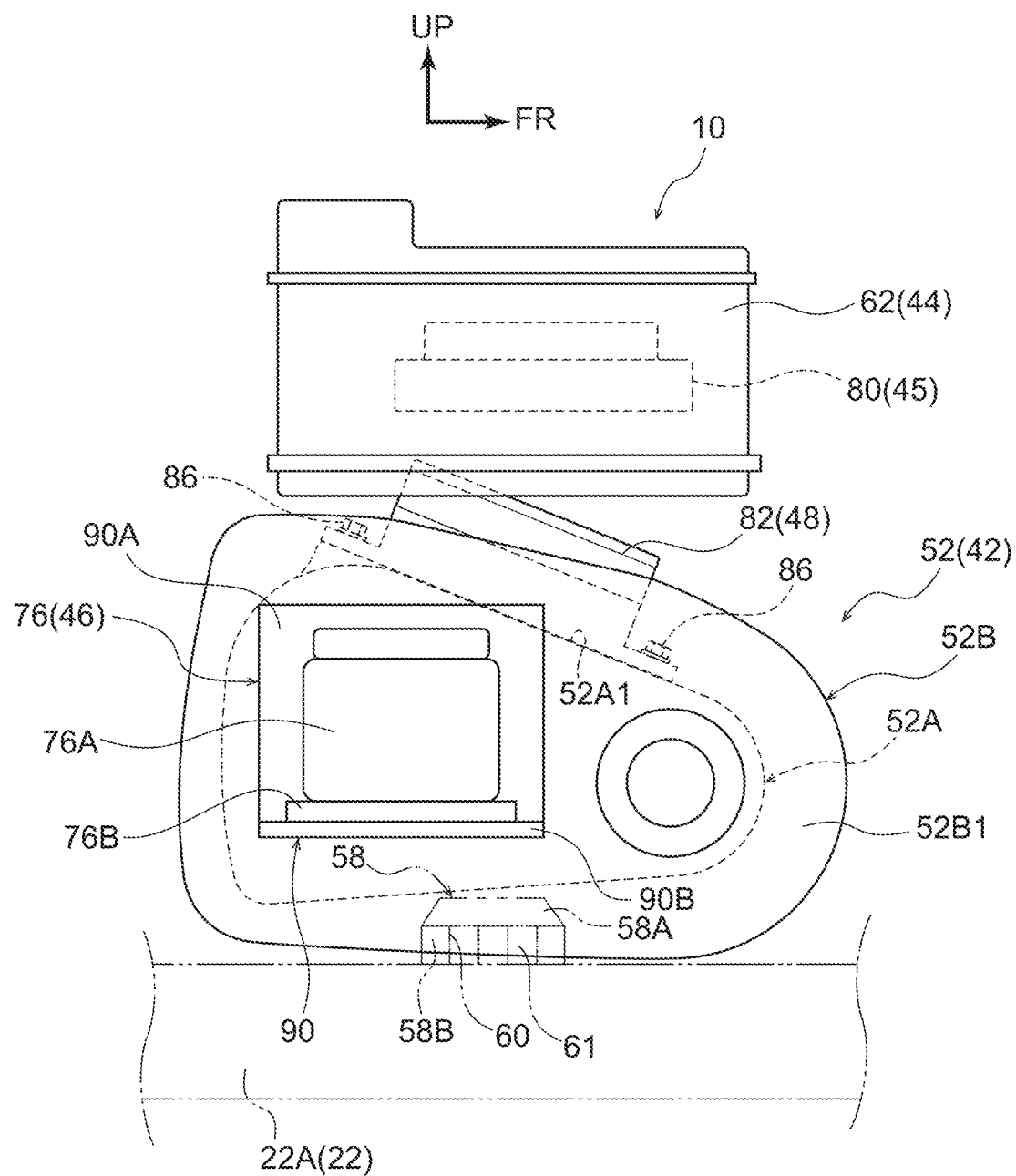
FIG. 1 is a side view illustrating configuration of a power unit and a compressor disposed inside a power unit room applied with a vehicle power unit room structure according to a first exemplary embodiment, as viewed from a vehicle width direction outer side (viewed along the direction of arrow 1 in FIG. 4)

Explanation follows regarding a first exemplary embodiment of a vehicle power unit room structure according to the present disclosure, with reference to FIG. 1 to FIG. 5. Note that in the drawings, the arrow FR indicates a vehicle front side, the arrow UP indicates a vehicle upper side, and the arrow RH indicates a vehicle width direction right side, as appropriate.

Figure 5:
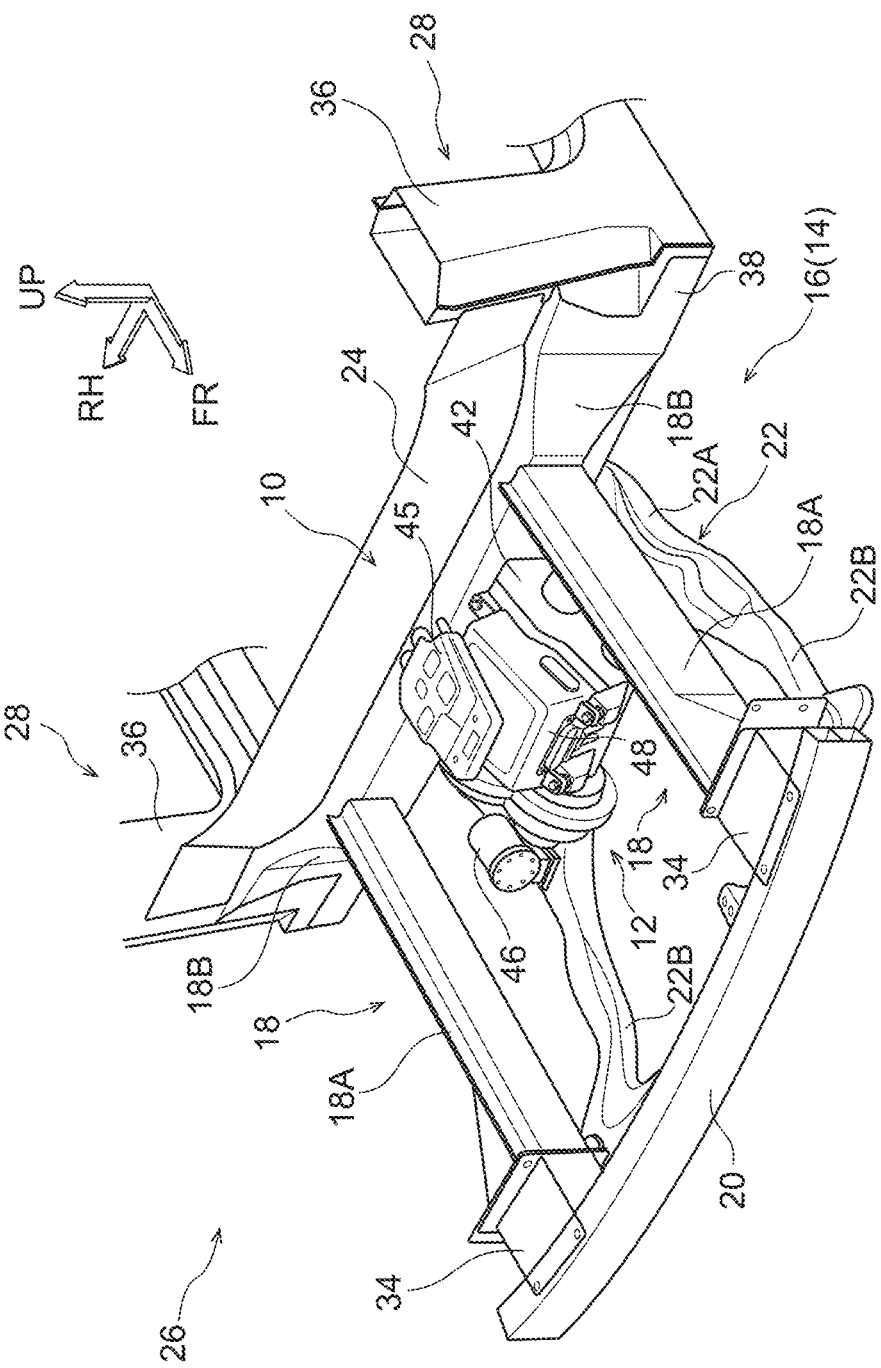
FIG. 5 is a perspective view illustrating configuration of a vehicle body front section and a power unit room applied with a vehicle power unit room structure according to the first exemplary embodiment, as viewed from a vehicle front and outer side.

First, explanation follows regarding configuration of a vehicle body front section 16 configuring a vehicle front side section of a vehicle body 14 that includes a power unit room 10 applied with the power unit room structure according to the present exemplary embodiment, with reference to FIG. 5.

The vehicle body front section 16 includes a pair of front side members 18 serving as vehicle body configuration members, bumper reinforcement 20 (referred to hereafter as bumper R/F 20), a suspension member 22, and a dash panel 24.

Each of the front side members 18 configures part of a vehicle side section 28 of a vehicle 26, and is disposed at a vehicle width direction outer side of the power unit room 10. Each of the front side members 18 is configured including a front portion 18A extending along the vehicle front-rear direction, and a kick portion 18B extending from a vehicle rear side portion of the front portion 18A in a downward gradient toward the vehicle rear side. Each of the front side members 18 functions as part of a side member of the vehicle body 14.

Figure 4:
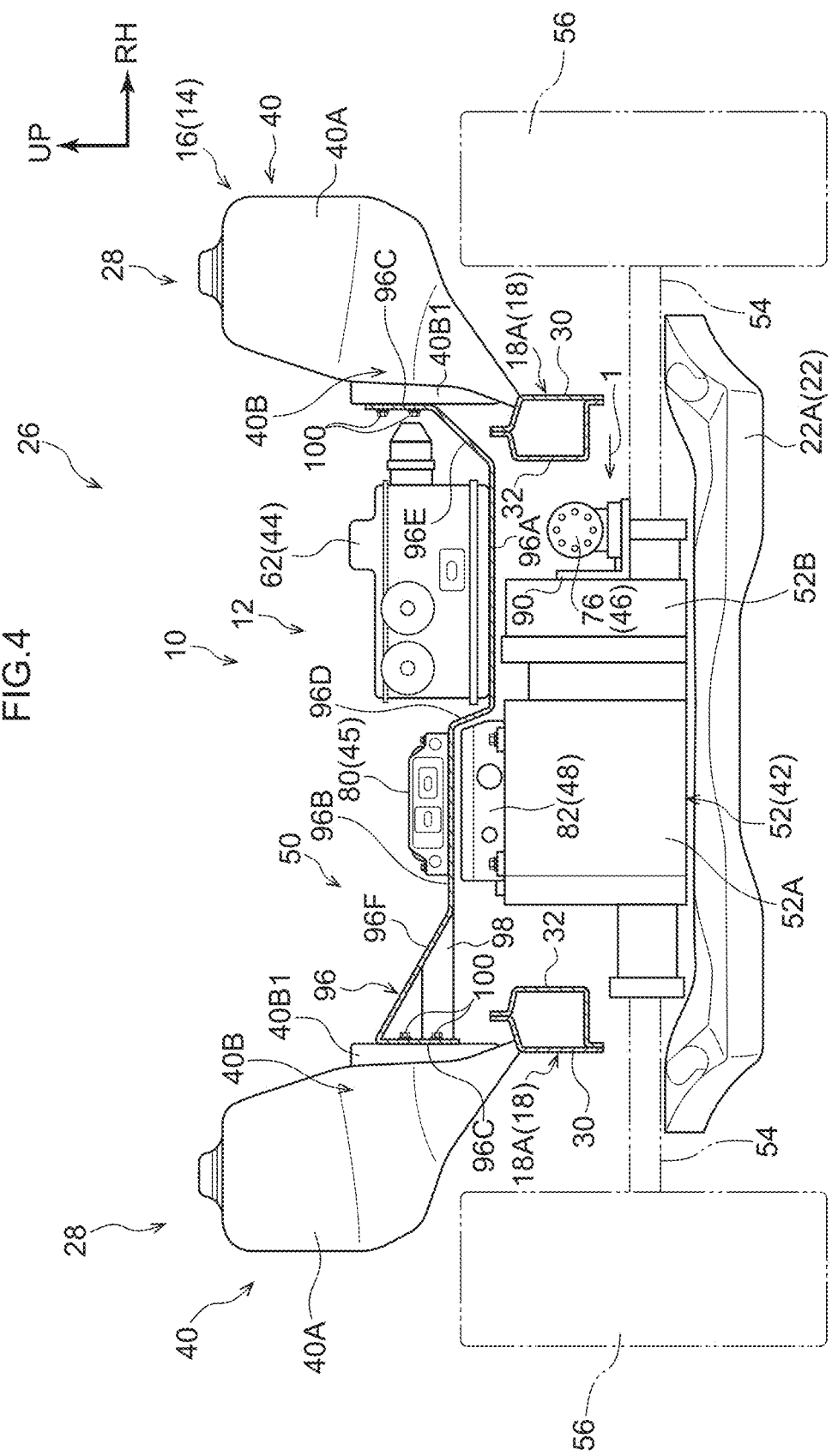
FIG. 4 is a back face view illustrating configuration of a vehicle body front section and a power unit room applied with a vehicle power unit room structure according to the first exemplary embodiment, as viewed from the vehicle rear side.

To explain in more detail, as is also illustrated in FIG. 4, each of the front portions 18A is configured including a front portion outer 30 configuring a vehicle width direction outer side portion of the front portion 18A, and a front portion inner 32 configuring a vehicle width direction inner side portion of the front portion 18A. The cross-section profile of the front portion 18A is configured with a substantially rectangular frame shaped closed cross-section structure as viewed along the vehicle front-rear direction.

The bumper R/F 20 is disposed at the vehicle front side of the front side members 18 with its length direction along the vehicle width direction, and is configured by an extruded aluminum alloy member with a rectangular frame shaped cross-section profile divided into upper and lower parts in the vehicle vertical direction as viewed along its length direction. Both end portions of the bumper R/F 20 are coupled to vehicle front side end portions of the respective front side members 18 through crash boxes 34, such that the bumper R/F 20 is in a state spanning between the pair of front side members 18 in the vehicle width direction.

The suspension member 22 is configured including a suspension body 22A configuring a main section of the suspension member 22, and a pair of extension portions 22B. The suspension body 22A is configured in a substantially rectangular shape as viewed along the vehicle vertical direction, and a vehicle rear side portion of the suspension body 22A is attached to vehicle rear side portions of the front portions 18A of the respective front side members 18 using attachment members, not illustrated in the drawings.

Suspension arms, not illustrated in the drawings, are attached to vehicle width direction outer side portions of the suspension body 22A. Note that vehicle lower side end portions of shock absorbers, not illustrated in the drawings, are coupled to leading end portions of the suspension arms.

Each of the extension portions 22B extends from a vehicle front side portion of the suspension body 22A toward the vehicle front side. Leading end side portions of the extension portions 22B are attached to vehicle front side portions of the front portions 18A of the front side members 18 by attachment members, not illustrated in the drawings.

Front pillars 36, each extending along the vehicle vertical direction, are disposed at the vehicle width direction outer sides of the front side members 18. Note that vehicle lower sides of the front pillars 36 are linked to the kick portions 18B of the front side members 18 through torque boxes 38. The dash panel 24 is disposed between the front side members 18 and at the vehicle rear side of the front side members 18.

The dash panel 24 is a pressed member, which extends along the vehicle width direction and the vehicle vertical direction. A plate thickness direction of the dash panel 24 is disposed in the vehicle front-rear direction. Join portions, not illustrated in the drawings, joined by welding or the like join vehicle width direction outer side end portions of the dash panel 24 to the front pillars 36, and a vehicle front side face of the dash panel 24 to the kick portions 18B of the front side members 18.

Note that in the present exemplary embodiment, the power unit room 10 may be considered to be a space delineated by the bumper R/F 20, the front side members 18, and the dash panel 24 as viewed along the vehicle vertical direction.

Suspension towers 40, serving as vehicle body configuration members configuring part of the vehicle side sections 28, are disposed at the vehicle width direction outer sides of the respective front side members 18.

Each of the suspension towers 40 is a pressed member configured including a suspension tower body 40A and a vertical wall 40B. The suspension tower body 40A configures a main section of the suspension tower 40, opens toward the vehicle lower side, and is configured in a box shape or tube shape configured to internally housing the shock absorber mentioned above and part of a non-illustrated spring attached to the shock absorber. Note that a vehicle upper side end portion of each of the shock absorbers is coupled to a vehicle upper side portion of the corresponding suspension tower body 40A.

Each of the vertical walls 40B extends toward the vehicle lower side from a vehicle width direction inner side portion of the corresponding suspension tower body 40A. A vehicle lower side end portion of the vertical wall 40B is joined to a vehicle upper side portion of the front portion 18A of the corresponding front side member 18 at a non-illustrated join portion by welding or the like.

Note that in the present exemplary embodiment, as illustrated in FIG. 4 and FIG. 5, a power unit 12 configured including a motor 42, a power supply section 44, a water heater 45, and a DC/AC inverter 48 (referred to hereafter as the inverter 48), and an air-conditioner compressor 46 serving as a compressor, are disposed inside the power unit room 10. A first feature of the present exemplary embodiment relates to the placement of the motor 42, the power supply section 44, and the air-conditioner compressor 46. A second feature of the present exemplary embodiment relates to the configuration of a cross member 50, serving as an attachment portion to which the power supply section 44 and the water heater 45 are attached. Detailed explanation follows regarding the power unit 12, the air-conditioner compressor 46, and the cross member 50, which configure relevant portions of the present exemplary embodiment.

The motor 42 includes a housing 52 configuring an outer casing of the motor 42. A motor body, a counter gear mechanism, and a differential gear mechanism, none of which are illustrated in the drawings, are disposed inside the housing 52. The motor body is driven when supplied with power, and drive force from the motor body is transmitted to a pair of drive shafts 54 through the counter gear mechanism and the differential gear mechanism in order to drive drive wheels 56 (front wheels).

The housing 52 is configured including a first housing portion 52A configuring a vehicle width direction left side portion of the housing 52, and a second housing portion 52B configuring a vehicle width direction right side portion of the housing 52. The motor body and most of the differential gear mechanism are contained inside the first housing portion 52A, and most of the counter gear mechanism is contained inside the second housing portion 52B.

As illustrated in FIG. 1, mounting brackets 58 are provided on both vehicle width direction sides of the housing 52. Each of the mounting brackets 58 is configured including an attachment portion 58A attached to the housing 52 by a non-illustrated attachment member, and a support portion 58B supported by the suspension body 22A. A through hole 60 is formed penetrating the support portion 58B the vehicle vertical direction, and a bush 61 configured by a rubber resilient body or the like is attached in the through hole 60. The mounting brackets 58 are attached to the suspension member body 22A through the bushes 62 to achieve a state in which the motor 42 is supported by the suspension member 22.

The power supply section 44 is disposed at the vehicle upper side of the second housing portion 52B of the motor 42. The inverter 48 is disposed at the vehicle upper side of the first housing portion 52A of the motor 42. The water heater 45 is disposed at the vehicle upper side of the inverter 48. Note that in FIG. 5, the power supply section 44 is omitted from illustration in order to facilitate understanding of the internal configuration of the power unit room 10.

Figure 2:
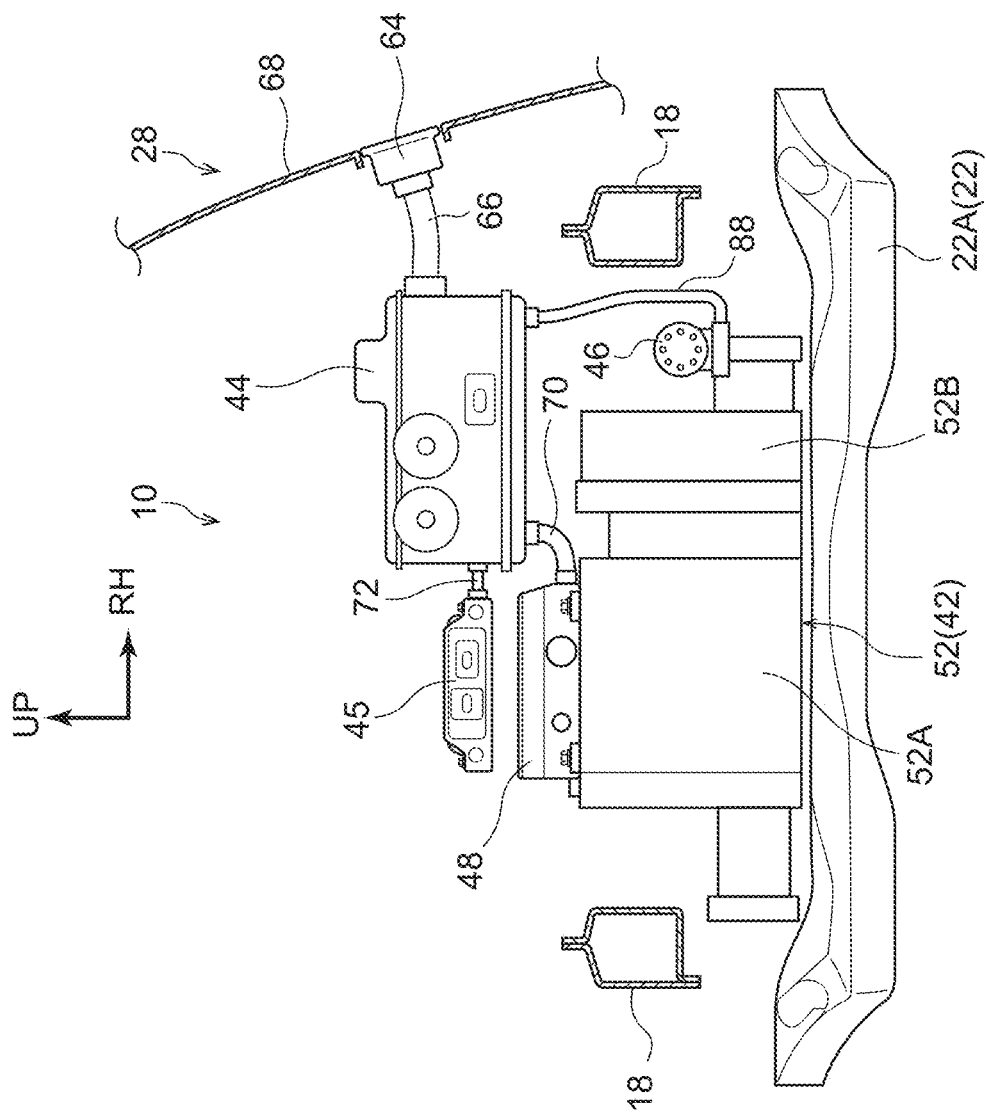
FIG. 2 is a back face view illustrating an electrically connected state of respective configuration elements disposed inside a power unit room applied with a vehicle power unit room structure according to the first exemplary embodiment, as viewed from the vehicle rear side.
Figure 3:
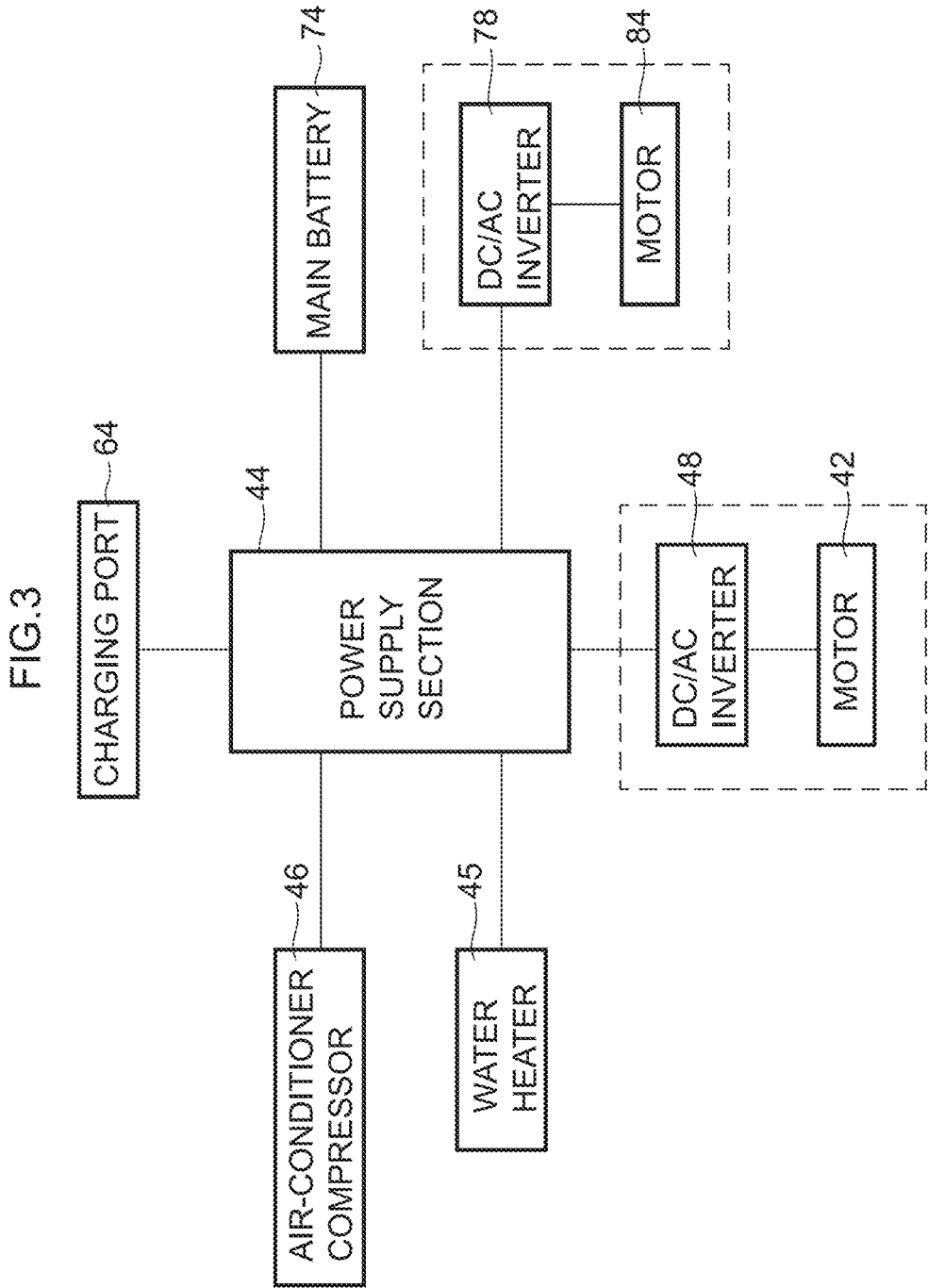
FIG. 3 is a block diagram illustrating an electrically connected state of respective configuration elements disposed inside a power unit room applied with a vehicle power unit room structure according to the first exemplary embodiment, and respective configuration elements disposed in the vicinity thereof.

To explain in more detail, the power supply section 44 includes a box-shaped housing 62 with a substantially rectangular block shaped external profile, and plural non-illustrated electronic components installed inside the housing 62, the electronic components namely being a high-voltage junction box, a DC charger relay, an AC charger, and a DC/DC inverter. As illustrated in FIG. 2 and FIG. 3, the power supply section 44 is electrically connected to a charging port 64 through a wire harness 66.

Moreover, in the present exemplary embodiment, as an example, the charging port 64 is provided with a fender portion 68 configuring part of a styling face side of the vehicle side section 28 on the vehicle width direction right side. The power supply section 44 is disposed further toward the charging port 64 side, namely further toward the vehicle width direction right side, than the inverter 48.

The power supply section 44 is electrically connected to the inverter 48 through a wire harness 70, and to the water heater 45 through a wire harness 72. Moreover, the power supply section 44 supplies (distributes) power supplied through the charging port 64 from an external power source such as a non-illustrated charging stand to a main battery 74, serving as a power source (internal power source). Power collected in the main battery 74 can be supplied (can be distributed) to the inverter 48 and the water heater 45 by the power supply section 44.

The power supply section 44 is also configured to supply power to the air-conditioner compressor 46 and a DC/AC inverter 78 (referred to hereafter as the inverter 78) disposed at the vehicle rear side.

As illustrated in FIG. 1, the water heater 45 is configured including a box-shaped housing 80 with a smaller external profile than that of the housing 62, and plural non-illustrated electronic components installed inside the housing 80. The water heater 45 is configured to warm air to be conveyed to the interior of a vehicle cabin.

To explain in more detail, the water heater 45 is driven by being supplied with power, and is configured to warm water (a heating medium) flowing toward a non-illustrated heater core through pipes connected to the heater core. Warm air can be blown into the vehicle cabin interior by being conveyed from a non-illustrated blower, through the heater core, and toward the vehicle cabin interior. As viewed along the vehicle width direction, the water heater 45 is disposed at a position overlapping with the power supply section 44, and more specifically, at a position where the entire outer periphery of the water heater 45 is contained within an outer periphery of the power supply section 44.

The inverter 48 is configured including box-shaped housing 82 that has a smaller external profile than that of the housing 62 and a larger external profile than that of the housing 80, and plural non-illustrated electronic components installed inside the housing 82. The inverter 48 is configured to convert supplied power so as to be configured to be supplied to the motor 42. To explain in more detail, the inverter 48 is configured to convert direct current from the main battery 74 or the like into alternating current, and passing the alternating current to the motor 42. Note that the inverter 78 is configured similarly to the inverter 48, and the inverter 78 is configured to convert supplied power so as to be configured to be supplied to a motor 84 that is configured to transmit drive force to non-illustrated drive wheels (rear wheels) at the vehicle rear side.

The inverter 48 configured as described above is attached to an upper wall 52A1 configuring a vehicle upper side portion of the first housing portion 52A of the housing 52. To explain in more detail, the upper wall 52A1 is inclined in a downward gradient from the vehicle rear side toward the vehicle front side, and the inverter 48 is disposed along the upper wall 52A1 and fixed to the housing 52 using bolts 86 (fastening members) at four corners of the housing 82.

As viewed along the vehicle width direction, a vehicle lower side portion of the power supply section 44 described above is disposed at a position overlapping with a vehicle upper side portion of the inverter 48. Part of the power supply section 44 may accordingly be considered to be positioned at the same vehicle vertical direction height as part of the inverter 48.

The air-conditioner compressor 46 is configured including a housing 76 configuring an outer casing of the air-conditioner compressor 46, a drive section such as a non-illustrated motor installed inside the housing 76, and a piston. The housing 76 is configured including a body 76A and a mount 76B. The body 76A is configured with a substantially circular column shaped external profile with its length direction along the vehicle front-rear direction, and the motor and the like mentioned above are contained within the body 76A. The mount 76B is provided at the vehicle lower side of the body 76A, and is configured in a plate shape with its plate thickness direction in the vehicle vertical direction. As described later, the mount 76B is used in attachment of the air-conditioner compressor 46.

As illustrated in FIG. 2, the air-conditioner compressor 46 is electrically connected to the power supply section 44 through a wire harness 88. The air-conditioner compressor 46 is configured to compress air-conditioner coolant when driven with power supplied from the power supply section 44.

Returning to FIG. 1, the air-conditioner compressor 46 is attached to the housing 52 of the motor 42 through a bracket 90. To explain in more detail, the bracket 90 includes an attachment tab 90A and a support tab 90B, and is configured in a plate shape that has been bent into an L-shape as viewed along the vehicle front-rear direction (see FIG. 4).

The attachment tab 90A is disposed following a side wall 52B1 configuring a vehicle width direction outer side portion of the second housing portion 52B of the housing 52, and is attached to the side wall 52B1 by a non-illustrated attachment member.

The support tab 90B extends from a vehicle lower side peripheral edge of the attachment tab 90A toward the vehicle width direction outer side, and the mount 76B of the housing 76 of the air-conditioner compressor 46 is placed on the support tab 90B from the vehicle upper side. The mount 76B is attached to the support tab 90B by a non-illustrated attachment member.

The air-conditioner compressor 46 attached to the motor 42 as described above is disposed adjacent to the motor 42 in the vehicle width direction so as to overlap with the motor 42 as viewed along the vehicle width direction. Part of the air-conditioner compressor 46 may thus be considered as being positioned at the same vehicle vertical direction height as part of the motor 42. More specifically, the air-conditioner compressor 46 is disposed at a position where the entire outer periphery of the air-conditioner compressor 46 is contained within the outer periphery of the motor 42 as viewed along the vehicle width direction.

Furthermore, the power supply section 44 is disposed at a vehicle upper side of the air-conditioner compressor 46. The power supply section 44 is disposed so as to overlap with the air-conditioner compressor 46 as viewed along the vehicle vertical direction. Part of the air-conditioner compressor 46 may thus be considered as being positioned at the same vehicle width direction position as part of the power supply section 44. More specifically, the air-conditioner compressor 46 is disposed at a position where the entire outer periphery of the air-conditioner compressor 46 is contained within the outer periphery of the power supply section 44 as viewed along the vehicle vertical direction (see FIG. 4).

In addition, as illustrated in FIG. 4, the air-conditioner compressor 46 is disposed at the vehicle width direction inner side of the corresponding front side member 18 such that there is spacing between the air-conditioner compressor 46 and the front side member 18, and the air-conditioner compressor 46 is disposed at a position that does not overlap with the front side member 18 as viewed along the vehicle vertical direction.

Next, explanation follows regarding configuration of the cross member 50. The cross member 50 includes a cross member body 96 and a reinforcing plate 98. The cross member body 96 is configured by bending a metal sheet at plural locations, and is configured including a placement portion 96A for placement of the power supply section 44, a placement portion 96B for placement of the water heater 45, and a pair of attachment tabs 96C.

The placement portion 96A has a plate shape extending along the vehicle width direction and the vehicle front-rear direction with its plate thickness direction in the vehicle vertical direction. A vehicle lower side face of the placement portion 96A is provided with plural weld nuts, not illustrated in the drawings. The power supply section 44 is fixed to the placement portion 96A by fastening of fastening members such as bolts, not illustrated in the drawings, that are inserted through the housing 62 from the vehicle upper side, to the weld nuts of the placement portion 96A in a state in which the power supply section 44 has been placed on the placement portion 96A.

The placement portion 96B has a plate shape extending along the vehicle width direction and the vehicle front-rear direction with its plate thickness direction in the vehicle vertical direction. A vehicle lower side face of the placement portion 96B is provided with plural weld nuts, not illustrated in the drawings. The placement portion 96B is disposed at the vehicle width direction right side and vehicle upper side with respect to the placement portion 96A. The water heater 45 is fixed to the placement portion 96B by fastening of fastening members such as bolts, not illustrated in the drawings, that are inserted through the housing 80 from the vehicle upper side to the weld nuts of the placement portion 96B in a state in which the water heater 45 has been placed on the placement portion 96B. Note that a vehicle width direction inner side peripheral edge of the placement portion 96B is linked to a vehicle width direction inner side peripheral edge of the placement portion 96A at a connection portion 96D extending from the vehicle width direction inner side peripheral edge of the placement portion 96B toward the vehicle width direction inner side and the vehicle lower side. Moreover, the connection portion 96D is provided with a non-illustrated insertion location through which the wire harness 70 is inserted.

The attachment tabs 96C each have a plate shape extending along the vehicle vertical direction and the vehicle front-rear direction with its plate thickness direction in the vehicle width direction, and each is formed with plural non-illustrated insertion locations. A vehicle lower side peripheral edge of the attachment tab 96C on the vehicle width direction right side is linked to a vehicle width direction outer side peripheral edge of the placement portion 96A at a connection portion 96E extending from the vehicle lower side peripheral edge of the attachment tab 96C toward the vehicle width direction inner side and the vehicle lower side. The connection portion 96E is provided with a non-illustrated insertion location through which the wire harness 88 is inserted. A vehicle upper side peripheral edge of the attachment tab 96C on the vehicle width direction left side is linked to a vehicle width direction outer side peripheral edge of the placement portion 96B at a connection portion 96F extending from the vehicle upper side peripheral edge of the attachment tab 96C toward the vehicle width direction inner side and the vehicle lower side.

The reinforcing plate 98 has a trapezoidal plate shape with an increasing width on progression from the vehicle upper side toward the vehicle lower side as viewed along the vehicle front-rear direction. A vehicle width direction inner side peripheral edge of the reinforcing plate 98 is joined to a vehicle lower side face of the connection portion 96F at a non-illustrated join portion by welding or the like, and a vehicle width direction outer side peripheral edge of the reinforcing plate 98 is joined to a vehicle width direction inner side face of the vehicle width direction left side attachment tab 96C at a non-illustrated join portion by welding or the like.

The vertical wall 40B of each of the suspension towers 40 is provided with an attachment wall 40B1 that is integral to the vertical wall 40B, has a plate thickness direction in the vehicle width direction, and extends along the vehicle vertical direction and the vehicle front-rear direction. A vehicle width direction outer side face of the attachment wall 40B1 is provided with non-illustrated weld nuts corresponding to the insertion locations of the corresponding attachment tab 96C. Bolts 100 (fastening members) are inserted through the insertion locations of the attachment tabs 96C from the vehicle width direction inner side and fastened to the weld nuts of the attachment walls 40B1 to fix the cross member 50 to the suspension towers 40 in a state in which the cross member 50 spans between the pair of suspension towers 40 in the vehicle width direction.

Note that in an attached state of the cross member 50 to the suspension towers 40, predetermined gaps are secured between a vehicle lower side face of the cross member 50, and the motor 42, the inverter 48, and the air-conditioner compressor 46, such that the cross member 50 does not interfere with the inverter 48 and the motor 42 during travel of the vehicle 26 or the like.

Operation and Advantageous Effects of Present Exemplary Embodiment

Explanation follows regarding operation and advantageous effects of the present exemplary embodiment.

In the present exemplary embodiment, as illustrated in FIG. 2 and FIG. 3, the motor 42 is disposed inside the power unit room 10, and power supplied from an external power source such as a charging stand or from an internal power source such as the main battery 74 is supplied from the power supply section 44 to the motor 42 through the inverter 48. On being supplied with power, the motor 42 is driven so as to transmit drive force to the drive wheels 56, thereby driving the drive wheels 56.

The air-conditioner compressor 46 is also disposed in the power unit room 10, and the air-conditioner compressor 46 is supplied with power by the power supply section 44. On being supplied with power, the air-conditioner compressor 46 is driven to compress the air-conditioner coolant.

Note that were the motor 42 and the air-conditioner compressor 46 to be disposed overlapping with each other in the vehicle front-rear direction, the space required to contain them would conceivably increase in the vehicle front-rear direction.

However, in the present exemplary embodiment, as illustrated in FIG. 1, the air-conditioner compressor 46 is disposed adjacent to the motor 42 in the vehicle width direction so as to overlap with the motor 42 as viewed along the vehicle width direction. Accordingly, an increase in the space required to contain the motor 42 and the air-conditioner compressor 46 in the vehicle front-rear direction can be suppressed by the amount the motor 42 and the air-conditioner compressor 46 overlap with each other as viewed along the vehicle width direction, in comparison to configurations in which the motor 42 and the air-conditioner compressor 46 are disposed overlapping with each other in the vehicle front-rear direction. This enables space that can be utilized for the cabin of the vehicle 26 to be secured, while suppressing an increase in the overall length of the vehicle 26.

Moreover, in the present exemplary embodiment, as illustrated in FIG. 2, the power supply section 44 is disposed at the vehicle upper side of the air-conditioner compressor 46 so as to overlap with the air-conditioner compressor 46 as viewed along the vehicle vertical direction. This enables the distance between the power supply section 44 and the air-conditioner compressor 46 to be made shorter than in configurations in which the power supply section 44 and the air-conditioner compressor 46 are disposed overlapping with each other in the vehicle front-rear direction as viewed along the vehicle vertical direction.

Accordingly, in the present exemplary embodiment, in the power unit room 10 in which the motor 42, the power supply section 44, and the air-conditioner compressor 46 are disposed, an increase in the length of a power supply route (the wire harness 88) from the power supply section 44 to the air-conditioner compressor 46 can be suppressed, while suppressing enlargement of the power unit room 10 in the vehicle front-rear direction.

Moreover, in the present exemplary embodiment, as illustrated in FIG. 1, the air-conditioner compressor 46 is attached to the motor 42 through the bracket 90. This enables the air-conditioner compressor 46 and the motor 42 to function as mutual mass dampers, enabling vibration of the air-conditioner compressor 46 and the motor 42 to be suppressed. Accordingly, the present exemplary embodiment enables vibration of components disposed in the power unit room 10 to be suppressed.

Moreover, in the present exemplary embodiment, as illustrated in FIG. 4, the air-conditioner compressor 46 is disposed at the vehicle width direction inner side of the corresponding front side member 18 extending along the vehicle width direction, such that there is spacing in the vehicle width direction between the air-conditioner compressor 46 and the front side member 18. Accordingly, even if the front side member 18 undergoes folding deformation toward the vehicle width direction inner side due to input of collision load along the vehicle front-rear direction to the vehicle 26, the amount of collision load that can be absorbed by deformation of the front side member 18 before the front side member 18 contacts the air-conditioner compressor 46 can be increased. This thereby enables a reduction in the load input to the air-conditioner compressor 46 from the front side member 18. Accordingly, in the present exemplary embodiment, the front side member 18 can be suppressed from affecting the air-conditioner compressor 46 when collision load is input to the vehicle 26 along the vehicle front-rear direction.

Moreover, in the present exemplary embodiment, the air-conditioner compressor 46 is disposed at a position that does not overlap with the corresponding front side member 18 extending along the vehicle front-rear direction as viewed along the vehicle vertical direction. Accordingly, the air-conditioner compressor 46 and the front side member 18 can be suppressed from interfering with one another, even if vibration during travel of the vehicle 26 or the like causes a change in the relative positional relationship between the air-conditioner compressor 46 and the front side member 18 in the vehicle vertical direction. Accordingly, in the present exemplary embodiment, the front side member 18 can be suppressed from affecting the air-conditioner compressor 46 as a result of vibration during travel of the vehicle 26 or the like.

In addition, in the present exemplary embodiment, the power supply section 44 is supported by the cross member 50 that spans between the pair of suspension towers 40 in the vehicle width direction, enabling the power supply section 44 to be supported in a stable state.

Since the pair of suspension towers 40 are coupled together in the vehicle width direction by the cross member 50, relative displacement of the suspension towers 40 in the vehicle width direction is suppressed during travel of the vehicle 26 or the like, such that torsion of the vehicle body 14 is suppressed. The present exemplary embodiment thus enables the effects of deformation of the vehicle body 14 on the power supply section 44 to be reduced during travel of the vehicle 26 or the like.

Second Exemplary Embodiment

Figure 6:
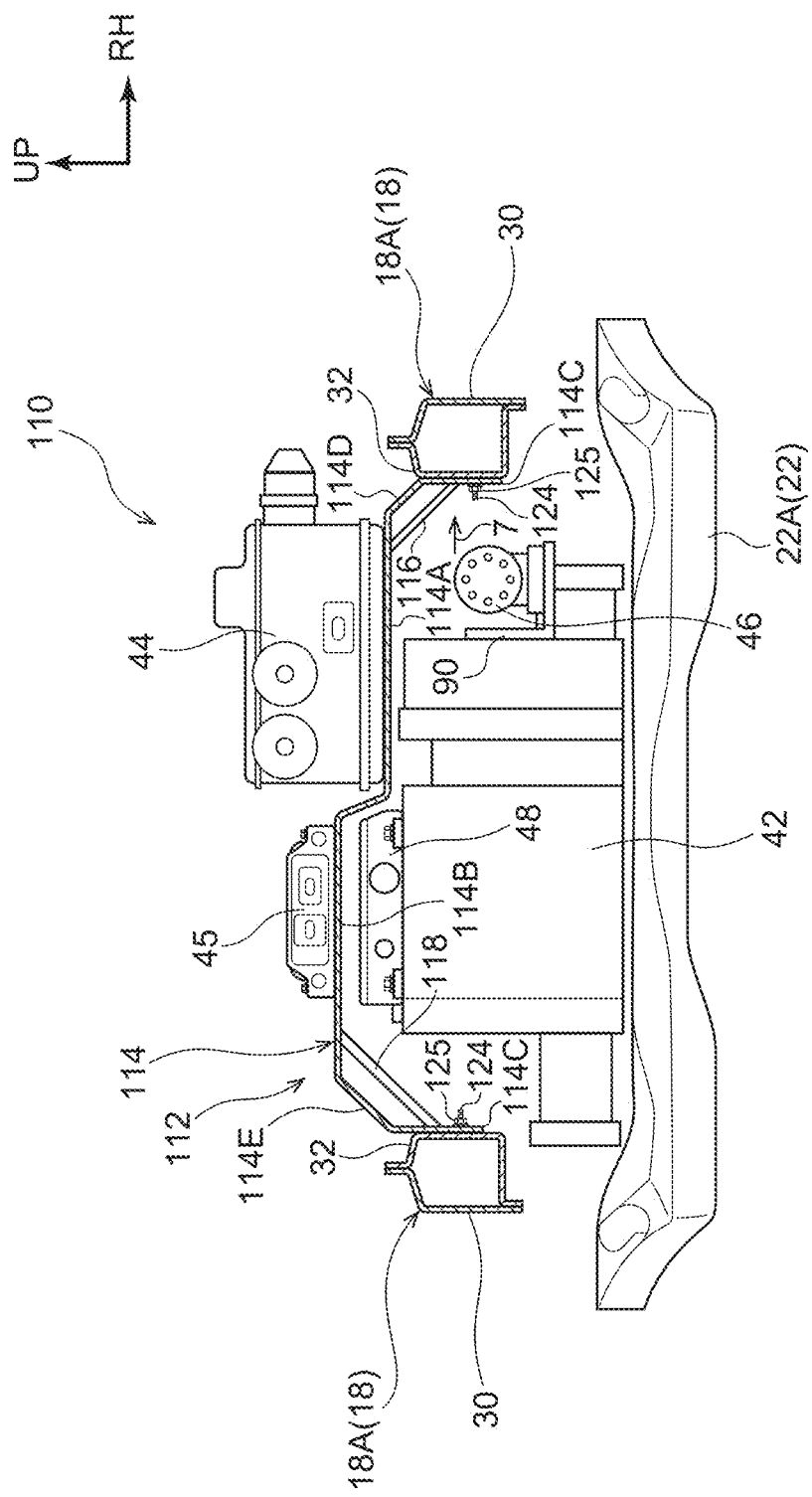
FIG. 6 is a back face view illustrating configuration of a vehicle body front section and a power unit room applied with a vehicle power unit room structure according to a second exemplary embodiment, as viewed from the vehicle rear side.
Figure 7:
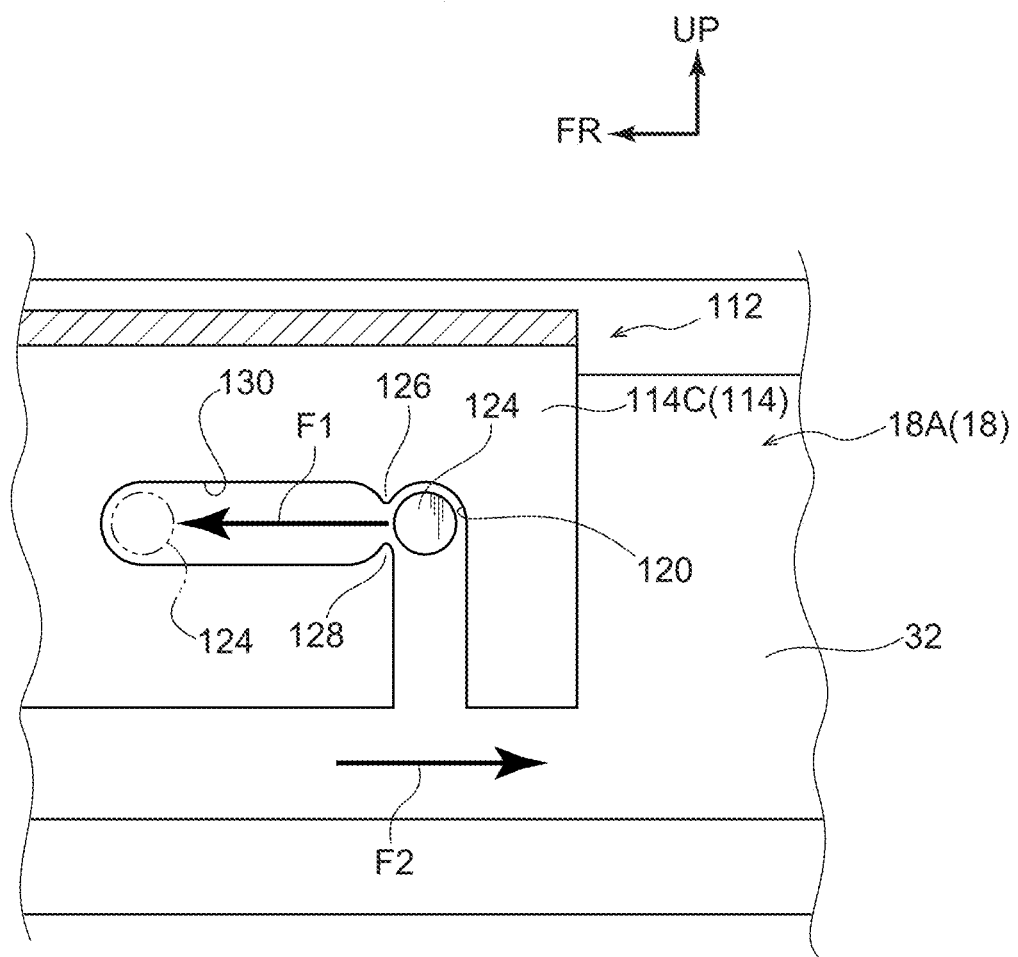
FIG. 7 is a side view illustrating a coupled state between a front side member and a mount of a power unit disposed inside a power unit room applied with a vehicle power unit room structure according to the second exemplary embodiment, as viewed from a vehicle width direction inner side (viewed along the direction of arrow 7 in FIG. 6)

Explanation follows regarding a second exemplary embodiment of a vehicle power unit room structure according to the present disclosure, with reference to FIG. 6 and FIG. 7. Note that configuration portions equivalent to those in the first exemplary embodiment described above are allocated the same reference numerals and explanation thereof is omitted.

As illustrated in FIG. 6, a power unit room 110 according to the present exemplary embodiment has the same basic configuration as the power unit room 10 according to the first exemplary embodiment, but includes a feature that a cross member 112, serving as an attachment portion that supports the power supply section 44 and the water heater 45, is attached to the front side members 18.

Specifically, the cross member 112 includes a cross member body 114, and reinforcing plates 116, 118. The cross member body 114 has the same basic configuration as the cross member body 96, and is configured including a placement portion 114A for placement of the power supply section 44, a placement portion 114B for placement of the water heater 45, and a pair of attachment tabs 114C.

The attachment tabs 114C each have a plate shape extending along the vehicle vertical direction and the vehicle front-rear direction with a plate thickness direction in the vehicle width direction. A vehicle upper side peripheral edge of the attachment tab 114C on the vehicle width direction right side is linked to a vehicle width direction outer side peripheral edge of the placement portion 114A at a connection portion 114D extending from the vehicle upper side peripheral edge of the attachment tab 114C toward the vehicle width direction inner side and the vehicle upper side. A vehicle upper side peripheral edge of the attachment tab 114C on the vehicle width direction left side is linked to a vehicle width direction outer side peripheral edge of the placement portion 114B at a connection portion 114E extending from the vehicle upper side peripheral edge of the attachment tab 114C toward the vehicle width direction inner side and the vehicle upper side.

The reinforcing plate 116 has a plate shape extending substantially parallel to the connection portion 114D. A vehicle width direction outer side end portion of the reinforcing plate 116 is joined to a vehicle width direction inner side face of the vehicle width direction right side attachment tab 114C at a non-illustrated join portion by welding or the like. A vehicle width direction inner side end portion of the reinforcing plate 116 is joined to a vehicle lower side face of the placement portion 114A at a non-illustrated join portion by welding or the like.

The reinforcing plate 118 has a plate shape extending substantially parallel to the connection portion 114E. A vehicle width direction outer side end portion of the reinforcing plate 118 is joined to a vehicle width direction inner side face of the vehicle width direction left side attachment tab 114C at a non-illustrated join portion by welding or the like. A vehicle width direction inner side end portion of the reinforcing plate 118 is joined to a vehicle lower side face of the placement portion 114B at a non-illustrated join portion by welding or the like.

As illustrated in FIG. 7, at plural discrete locations along the vehicle front-rear direction, each of the attachment tabs 114C is provided with insertion locations 120 through which stud bolts 124, serving as shafts projecting from the front portion 18A of the corresponding front side member 18 toward the vehicle width direction inner side, are inserted in the axial direction of the stud bolts 124.

As viewed along the vehicle width direction, each of the insertion locations 120 has a slit shape extending from a vehicle vertical direction central portion of the attachment tab 114C as far as a vehicle lower side end portion of the attachment tab 114C. As is also illustrated in FIG. 6, in a state in which the stud bolt 124 has been inserted through a vehicle upper side end portion of the insertion location 120, a nut 125 is fastened to the stud bolt 124 from the vehicle width direction inner side, thereby attaching the cross member 112 to the corresponding front side member 18.

A feature of the present exemplary embodiment is that fuse portions 126, 128 and a slit 130 are provided adjacent to each of the insertion locations 120 in the attachment tabs 114C.

To explain in more detail, a vehicle front side part of a peripheral edge of the vehicle upper side end portion of each of the insertion locations 120 is open. The corresponding slit 130 is provided contiguously to the insertion location 120 so as to extend along the vehicle front-rear direction at the vehicle front side of the vehicle upper side end portion of the insertion location 120. A sheet vertical direction length (width) of each of the slits 130 is set to a length that allows insertion of the corresponding stud bolt 124.

The fuse portions 126, 128 are provided as a pair in the vehicle vertical direction at a boundary between each of the insertion locations 120 and the corresponding slit 130, and configure part of the peripheral edge of the insertion location 120. As viewed along the vehicle width direction, the vehicle upper side fuse portion 126 has a substantially triangular profile decreasing in width on progression from the vehicle upper side toward the vehicle lower side. As viewed along the vehicle width direction, the vehicle lower side fuse portion 128 has a substantially triangular profile decreasing in width on progression from the vehicle lower side toward the sheet upper side.

When a load F1 toward the vehicle front side of a predetermined value or greater acts on the fuse portions 126, 128 from the stud bolt 124, plastic deformation occurs so as to permit relative displacement in the vehicle front-rear direction between the stud bolt 124 and the insertion location 120.

The present exemplary embodiment configured as described above exhibits similar operation and advantageous effects to the first exemplary embodiment described above, with the exception of operation and advantageous effects deriving from the attachment configuration of the cross member 50 to the suspension towers 40.

In the present exemplary embodiment, the power supply section 44 is supported by the cross member 112 that spans between the pair of front side members 18 in the vehicle width direction. The pair of front side members 18 are coupled together in the vehicle width direction by the cross member 112, such that the bumper R/F 20, the pair of front side members 18, and the cross member 112 are in a state configured with a rigid frame structure.

Accordingly, when the front side members 18 undergo crushing deformation due to collision load F2 from the vehicle front side, the front side members 18 are suppressed from undergoing displacement in the vehicle width direction relative to each other by the cross member 112. This suppresses the front side members 18 from undergoing folding deformation in the vehicle width direction during crushing deformation of the front side members 18, enabling the front side members 18 to be made to undergo axial compression deformation. This enables shock absorption performance of the front side members 18 to be secured, while the power supply section 44 is supported in a stable state.

Moreover, in the present exemplary embodiment, the stud bolts 124 are provided projecting toward the vehicle width direction inner side from the pair of front side members 18. The cross member 112, to which the power supply section 44 is attached, is attached to the stud bolts 124.

Note that during crushing deformation of the front side members 18 due to the collision load F2 from the vehicle front side, it is conceivable that the front side members 18 might not undergo crushing deformation so readily at the attachment locations of the front side members 18 to the cross member 112.

In the present exemplary embodiment, the cross member 112 is provided with the insertion locations 120, and the stud bolts 124 provided at the front side members 18 are inserted into the insertion locations 120. The cross member 112 is also provided with the fuse portions 126, 128 adjacent to the insertion locations 120. When the load F1 toward the vehicle rear side of the predetermined value or greater acts on the cross member 112, the fuse portions 126, 128 receive load from the stud bolts 124 and undergo plastic deformation, thereby permitting relative displacement between the stud bolts 124 and the insertion locations 120 in the vehicle front-rear direction, and thus permitting relative displacement between the front side members 18 and the cross member 112.

Accordingly, during crushing deformation of the front side members 18 due to the collision load F2 from the vehicle front side, the cross member 112 is configured to be displaced toward the vehicle rear side such that the cross member 112 can be suppressed from acting as resistance to the crushing deformation, even if the crushing deformation reaches the locations provided with the stud bolts 124. This thereby enables the crushing stroke of the front side members 18 in response to the collision load F2 from the vehicle front side to be secured, while the power supply section 44 is supported in a stable state.

In addition, in the present exemplary embodiment, the insertion locations 120 are each configured in a slit shape extending along the vehicle vertical direction. This enables the insertion locations 120 and stud bolts 124 to be used as sub assembly guides during attachment of an assembly configured including the power supply section 44, the water heater 45, and the cross member 112 to the vehicle body 14.

Third Exemplary Embodiment

Explanation follows regarding a third exemplary embodiment of a vehicle power unit room structure according to the present disclosure, with reference to FIG. 8. Note that configuration portions equivalent to those in the first exemplary embodiment described above are allocated the same reference numerals and explanation thereof is omitted.

Although a power unit room 140 according to the present exemplary embodiment has the same basic configuration as the power unit room 10 according to the first exemplary embodiment, as a first feature, the power unit room 140 may be configured such that the water heater 45 is not disposed therein, depending on the specifications of the vehicle 26. Moreover, a second feature is that the power supply section 44 is attached to the vehicle width direction right side front side member 18 in a cantilevered state by a bracket 142 serving as an attachment portion.

Specifically, the bracket 142 includes a bracket body 144 and a reinforcing plate 146. The bracket body 144 includes a placement portion 144A configured similarly to the placement portion 96A, and an attachment tab 144B.

The attachment tab 144B has a plate shape extending along the vehicle vertical direction and the vehicle front-rear direction with its plate thickness direction in the vehicle width direction. The attachment tab 144B is fixed to the corresponding front side member 18 by a non-illustrated attachment member or at a join portion by welding or the like. Note that as in the second exemplary embodiment described above, the attachment tab 144B may be provided with the insertion locations 120, the slits 130, and the fuse portions 126, 128, and the attachment tab 144B may be attached to the front side member 18 using stud bolts 124 provided at the front side member 18.

The reinforcing plate 146 has a plate shape extending from a vehicle lower side end portion of the attachment tab 144B toward a central portion of the placement portion 144A. A vehicle width direction outer side end portion of the reinforcing plate 146 is joined to a vehicle width direction inner side face of the attachment tab 144B at a non-illustrated join portion by welding or the like. A vehicle width direction inner side end portion of the reinforcing plate 146 is joined to a vehicle lower side face of the placement portion 144A at a non-illustrated join portion by welding or the like.

The present exemplary embodiment configured as described above exhibits similar operation and advantageous effects to the first exemplary embodiment described above, with the exception of operation and advantageous effects deriving from the water heater 45 and the attachment configuration of the cross member 50 to the suspension towers 40.

In the present exemplary embodiment, the power supply section 44 is attached to one of the pair of front side members 18 through the bracket 142 that is attached to the one front side member 18. This enables the power supply section 44 to be supported in a stable state while suppressing an increase in the complexity of structures peripheral to the power unit room 140. Note that the bracket 142 may be attached to the vehicle width direction left side front side member 18, depending on the configuration of the power unit 12 and the like.

Fourth Exemplary Embodiment

Explanation follows regarding a fourth exemplary embodiment of a vehicle power unit room structure according to the present disclosure, with reference to FIG. 9. Note that configuration portions equivalent to those in the first exemplary embodiment described above are allocated the same reference numerals and explanation thereof is omitted.

Although a power unit room 150 according to the present exemplary embodiment has the same basic configuration as the power unit room 10 according to the first exemplary embodiment, a feature is that the air-conditioner compressor 46 is attached to the motor 42 through a support member 152 serving as a first support portion, a support member 154 serving as a second support portion, and a shock absorber 156 serving as an attenuation portion.

Specifically, the support member 152 has a plate shape bent into an L-shape as viewed along the vehicle front-rear direction, and includes an attachment tab 152A and a support tab 152B. The attachment tab 152A is disposed following the side wall 52B1 of the housing 52 of the motor 42, and is attached to the side wall 52B1 by a non-illustrated attachment member.

The support tab 152B extends from a vehicle lower side peripheral edge of the attachment tab 152A toward the vehicle width direction outer side and supports the shock absorber 156.

The support member 154 has a plate shape bent into a substantially Z-shape as viewed along the vehicle front-rear direction, and includes a support tab 154A, an upright tab 154B, and an attachment tab 154C. The support tab 154A is disposed with its plate thickness direction in the vehicle vertical direction at the vehicle lower side of the mount 76B of the housing 76 of the air-conditioner compressor 46, and is attached to the housing 76 by a non-illustrated attachment member.

The upright tab 154B extends from a vehicle width direction inner side peripheral edge of the support tab 154A toward the vehicle upper side, and the attachment tab 154C extends toward the vehicle width direction inner side (the motor 42 side) from a vehicle upper side peripheral edge of the upright tab 154B. The shock absorber 156 is attached to the attachment tab 154C.

The shock absorber 156 is configured including a damper 158 and a spring 160. The damper 158 is a twin-tube oil damper configured including a piston rod 162, an outer tube 164, a non-illustrated inner tube installed inside the outer tube 164, and the like. A leading end portion 162A of the piston rod 162 is attached to the attachment tab 154C of the support member 154 by a non-illustrated attachment member, and a base end portion 164A on the opposite side of the outer tube 164 to the leading end portion 162A is attached to the support tab 152B of the support member 152 by a non-illustrated attachment member.

A rod portion 162B of the piston rod 162 and the outer tube 164 are each provided with an anchor tab 166, and the spring 160 is disposed between the anchor tabs 166. The spring 160 is configured to bias the piston rod 162 toward the vehicle upper side. The shock absorber 156 configured as described above couples the motor 42 and the air-conditioner compressor 46 together and is configured to attenuate relative vibration therebetween.

The present exemplary embodiment configured as described above exhibits similar operation and advantageous effects to the first exemplary embodiment described above, with the exception of operation and advantageous effects deriving from the attachment of the air-conditioner compressor 46 to the motor 42 through the bracket 90.

Moreover, in the present exemplary embodiment, the support member 154 that supports the air-conditioner compressor 46 is supported, through the shock absorber 156, by the support member 152 attached to the motor 42.

In order to make the air-conditioner compressor 46 function as a mass damper for the motor 42 and suppress vibration of the motor 42, the mass of the air-conditioner compressor 46 is preferably similar to the mass of the motor 42. However, such a configuration could result in an increase in the size of the air-conditioner compressor 46.

In the present exemplary embodiment, the shock absorber 156 is configured to attenuate relative vibration between the motor 42 and the air-conditioner compressor 46, thus enabling the air-conditioner compressor 46 and the shock absorber 156 to be made to function as an attenuating dynamic vibration absorber for the motor 42. This thereby enables vibration of the motor 42 to be absorbed without making the mass of the air-conditioner compressor 46 similar to the mass of the motor 42, thus enabling vibration generated by the motor 42 to be suppressed.

Supplementary Explanation of Above Exemplary Embodiments (1) In the exemplary embodiments described above, although the power unit room applied with the vehicle power unit room structure according to the above exemplary embodiments is disposed at the vehicle front side, there is no limitation thereto. Namely, depending on the specifications of the vehicle 26 and the like, a power unit room applied with the vehicle power unit room structure according to the above exemplary embodiments may be disposed at the vehicle rear side. Note that when adopting such a configuration, the cross member 112 and the bracket 142 are attached to rear side members.

(2) In the exemplary embodiments described above, although the motor body, the counter gear mechanism, and the differential gear mechanism of the motor 42 have an integral configuration, there is no limitation thereto. Namely, depending on the specifications of the vehicle 26 and the like, the motor 42 may be configured primarily by the motor body, with the counter gear mechanism and the differential gear mechanism being configured separately to the motor 42.

(3) In the exemplary embodiments described above, although the air-conditioner compressor 46 is attached to the motor 42 through another member, there is no limitation thereto. Namely, depending on the specifications of the motor 42 and the air-conditioner compressor 46, the air-conditioner compressor 46 may be attached directly to the motor 42. As long as the air-conditioner compressor 46 is disposed adjacent to the motor 42 in the vehicle width direction so as to overlap with the motor 42 as viewed along the vehicle width direction, depending on the specifications of the vehicle 26 and the like, the air-conditioner compressor 46 may be attached to the cross member 50, 112 or the bracket 142, either directly or through another member.

(4) In the exemplary embodiments described above, although the power supply section 44 is configured including the high-voltage junction box and the like, there is no limitation thereto. Namely, depending on the specifications of the vehicle 26 and the like, the power supply section 44 may be configured by a fuel cell stack. When adopting such a configuration, a compressor used to supply air to the fuel cell stack may be disposed at a position where the air-conditioner compressor 46 would otherwise be attached.

What is claimed is:

1. A vehicle power unit room structure comprising:
a motor that is disposed inside a power unit room and that is configured to transmit drive force to a drive wheel;
a compressor that is disposed adjacent to the motor in a vehicle width direction so as to overlap with the motor as viewed along the vehicle width direction; and
a power supply section that is configured to supply power from a power source to the motor and the compressor, and that is disposed at a vehicle upper side of the compressor so as to overlap with the compressor as viewed along a vehicle vertical direction,
wherein
the power supply section is attached to an attachment portion provided at at least one of a pair of side members,
the attachment portion is a cross member spanning between the pair of side members in the vehicle width direction, each of the pair of side members is provided with a shaft that projects toward a vehicle width direction inner side and that is used in attachment of the cross member, and the cross member is provided with an insertion location through which the shafts are inserted in an axial direction of the shafts, and a fuse portion provided adjacent to the insertion location and configured to undergo plastic deformation so as to permit relative displacement in a vehicle front-rear direction between the shafts and the insertion location in a case in which a load of a predetermined value or greater toward a vehicle rear side acts on the attachment portion.

2. The vehicle power unit room structure of claim 1, wherein the compressor is attached to the motor either directly or indirectly.

3. The vehicle power unit room structure of claim 1, wherein the compressor is disposed at the vehicle width direction inner side of one of the pair of side members, which extends along the vehicle front-rear direction, such that there is spacing in the vehicle width direction between the compressor and the one of the pair of side members.

4. The vehicle power unit room structure of claim 1, wherein the compressor is disposed at a position that does not overlap with one of the pair of side members, which extends along the vehicle front-rear direction, as viewed along the vehicle vertical direction.

5. The vehicle power unit room structure of claim 1, wherein the attachment portion is a bracket attached to the at least one of the pair of side members.

\* \* \* \* \*